May 8, 1934.　　　　H. DAHLSTRAND　　　　1,957,699

FLANGE CONNECTION

Filed April 25, 1930

Inventor
H. Dahlstrand
by
Attorney

Patented May 8, 1934

1,957,699

UNITED STATES PATENT OFFICE 1,957,699

FLANGE CONNECTION

Hans Dahlstrand, Wauwatosa, Wis., assignor to Allis-Chalmers Manufacturing Company, Milwaukee, Wis., a corporation of Delaware Application April 25, 1930, Serial No. 447,398

8 Claims. (Cl. 253—39)

The present invention relates in general to improvements in the art of rigidly but detachably uniting coacting elements, and relates more specifically to improvements in the construction of releasable connections for firmly clamping the flanges of a pair of coacting casing sections together.

An object of the invention is to provide an improved flange connection which is simple and compact in construction, which may be conveniently applied or removed, and which serves to rigidly unite the elements to which it is applied.

In the construction of certain machines such as steam turbines, which are subject to extreme temperature variations and wherein the casings are also subject to relatively high internal pressures, it is desirable in order to avoid distortion of the casing, to eliminate massive integral local metallic portions such as heavy flanges. If the casings are provided with relatively massive locally enlarged portions, the distortion due to differential heating and cooling of the thin and massive portions of the casing, becomes a serious problem because of the relatively close clearances provided between the rotating and stationary elements of the turbine structure. Due to the enormous internal pressures to which turbine casings are frequently subjected, it is necessary to provide an extremely strong and rigid connection between the casing sections, especially at the zones of high pressure.

It is a more specific object of the present invention to provide a detachable clamp associable with relatively light flanges of casing sections, which will cooperate with the usual clamping elements provided between the flanges, to additionally clamp these flanges together. It is a further specific object of the invention to provide means for facilitating application of relatively heavy clamps to casing flanges. This is accomplished by fastening the clamping members to the adjacent flanges without producing a clamping action between the flanges, in addition to providing clamping studs for urging the members against the flanges so as to clamp the latter together. A further object of the invention is to provide means for maintaining the temperature of the clamping mechanism substantially the same as that of the flanges with which the mechanism is associated, in order to avoid possible loosening of the clamp or relative distortion of the coacting elements. These and other objects and advantages will appear from the following detailed description.

A clear conception of several embodiments of the invention and of the mode of constructing and of applying clamping devices built in accordance therewith, may be had by referring to the drawing accompanying and forming a part of this specification in which like reference characters designate the same or similar parts in the various views.

As shown in Figs. 1 to 4 inclusive, the steam turbine casing comprises upper and lower sections 2, 3 respectively, having coacting integral flanges 13 extending along the opposite sides thereof. The flanges 13 of the casing sections 2, 3 are normally clamped directly to each other by means of studs 7 and clamping nuts 11. The studs 7 are ordinarily so disposed that alternate studs are secured directly to the same casing section, whereas the intermediate studs are secured directly to the other casing section.

Figure 1:
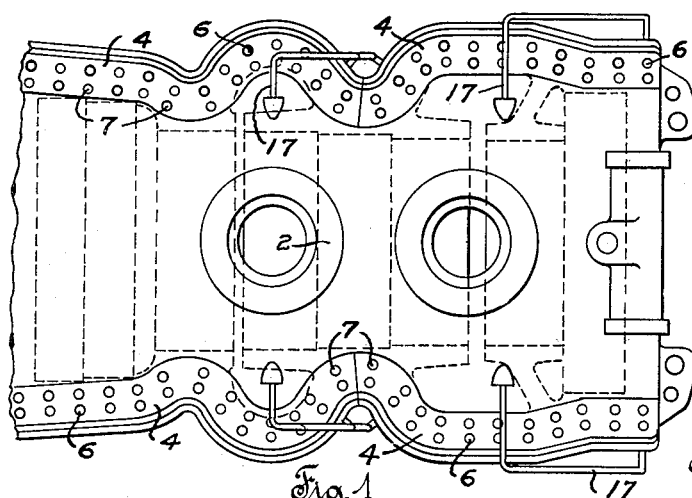
Fig. 1 is a fragmentary top view of the high pressure end of a steam turbine casing, showing one form of the improved clamp applied thereto.
Figure 2:
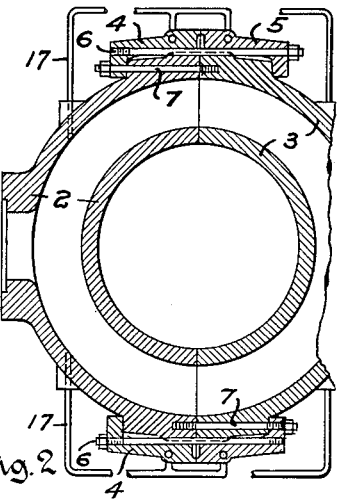
Fig. 2 is a transverse vertical section through the steam turbine casing illustrated in Fig. 1.
Figure 4:
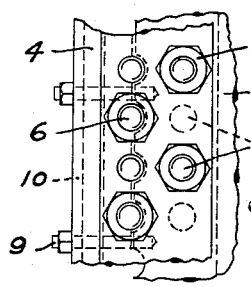
Fig. 4 is a fragmentary top view of the casing and clamp of Fig. 3.
Figure 3:
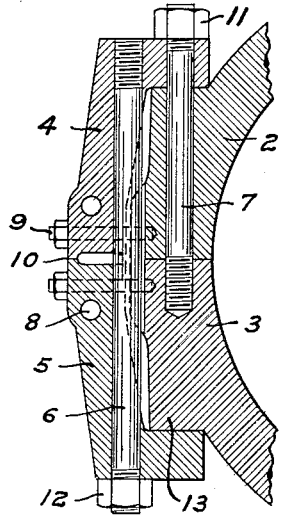
Fig. 3 is an enlarged fragmentary transverse vertical section through the turbine casing and through one form of improved clamp.

The improved clamp specifically illustrated in Figs. 3 and 4 comprises clamp members 4, 5 each of which has a lateral projection provided with a plane surface coacting with an adjacent flange 13, and which members 4, 5 coact directly with each other along a relatively narrow contact area 10. The clamp members 4, 5 are interconnected by means of clamping studs 6 and coacting nuts 12 disposed between the contact area 10 and the surfaces of coaction between the member projections and the flanges 13. The member 4 may be initially attached to the adjacent flange 13 of the casing section 2 by means of one or more positioning studs 9 and a nut coacting therewith, and the member 5 may likewise be initially attached to the flange 13 of the adjacent casing section 3 by means of one or more studs 9 and coacting nuts. The studs 9 merely facilitate assembly of the clamp and do not produce a clamping effect upon the flanges 13 of the casing sections. Each of the members 4, 5 is moreover provided with passages 8 extending longitudinally through these members, these passages being placed in communication with the interior of the casing by means of piping 17 so as to permit fluid to pass from within the casing through the passages 8 and to return to the casing at a stage of lower pressure, to thereby maintain the temperature of the clamp members 4, 5 substantially equal to that of the adjacent flanges of the casing sections 2, 3. In the embodiment of Figs. 3 and 4, the studs 7 pass directly through the lateral projections of the members 4, 5 and the nuts 11 coact with the flanges 13 through the intervening projections of the clamp members 4, 5.

Figure 6:
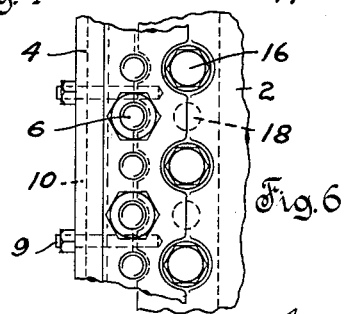
Fig. 6 is a fragmentary top view of the clamp and casing illustrated in Fig. 5.
Figure 5:
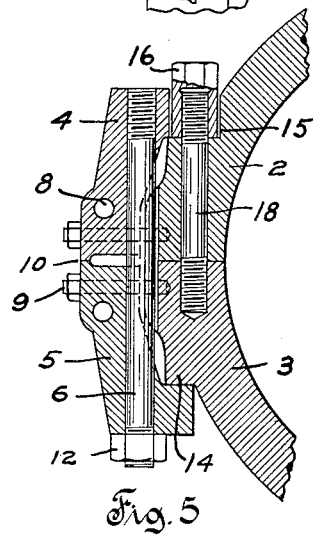
Fig. 5 is a similarly enlarged transverse vertical section through a fragment of a turbine casing and through another form of the improved clamp.

Referring specifically to Figs. 5 and 6, the clamp members 4, 5 are likewise provided with projections coacting with the flanges 14 of the casing sections 2, 3, but the casing studs 18 are engaged by special socket nuts 16 which directly engage the flanges 14 and which are disposed within notched portions of the clamp member projections. The socket nuts 16 are disposed within local recesses 15 formed in the casing sections 2, 3, and project beyond the outer surfaces of the clamp member projections, so as to permit release of the nut 16 without removing the clamp members 4, 5. This provides a somewhat more compact clamp construction than that illustrated in Fig. 3, although the construction may not be quite as strong as that illustrated in Fig. 3 assuming that the several elements are formed of the same materials. The clamp members 4, 5 of Fig. 5 are likewise provided with the initial retaining studs 9 and with the longitudinal temperature control passages 8.

Figure 8:
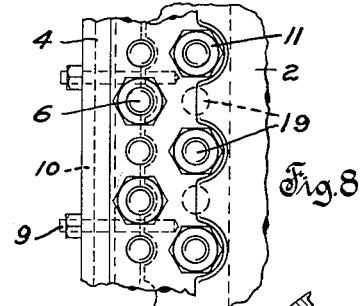
Fig. 8 is a fragmentary top view of the clamp and casing illustrated in Fig. 7.
Figure 7:
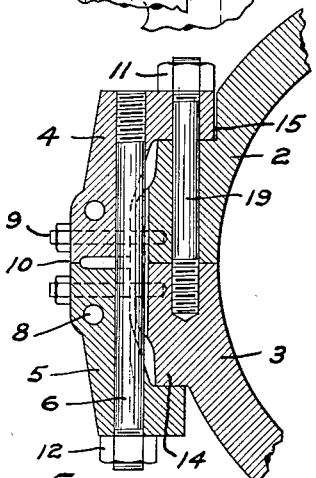
Fig. 7 is a similarly enlarged transverse vertical section through a fragment of a turbine casing and through still another form of the improved clamp.

As illustrated in Figs. 7 and 8, the clamping studs 19 of the casing sections 2, 3 again pass through snugly fitting holes in the lateral projections of the clamp members 4, 5, and the clamp members are held firmly in place by relative clamping of the flanges 14 to each other. The construction of Figs. 7 and 8 is similar to that of Figs. 3 and 4, in that the studs 19 pass through the lateral projections of the clamp members 4, 5, but it is also similar to that of Figs. 5 and 6 in that the casing sections 2, 3 are provided with lighter flanges 14 and are provided with recesses 15 for receiving added extensions formed on the lateral projections of the clamp members 4, 5.

In assembling a casing and applying one of the improved clamps thereto, the casing sections 2, 3 are first assembled with the parallel studs 7, 18, 19 in place. With the form of clamp disclosed in Fig. 5, the socket nuts 16 may be then applied and the casing flanges 14 initially clamped together without first applying the clamp members 4, 5. With the form of clamps disclosed in Figs. 3 and 7, the clamp members 4, 5 must be applied to the studs 7, 19 before the clamping nuts 11 are applied to directly clamp the flanges of the casing sections 2, 3 together. The clamp members 4, 5 may be properly positioned upon the flanges 13, 14 by applying the studs 9 and the nuts coacting therewith, either before or after the initial clamping has been effected. Final clamping of the flanges may then be effected by applying the clamping studs 6 and the nuts 12. When the nuts 12 are screwed upon the studs 6, the clamp members 4, 5 are brought into direct engagement with each other along the contact areas 10, and are subsequently caused to urge the adjacent flanges 13, 14 of the casing sections 2, 3 into firm engagement with each other.

By admitting fluid from the casing through the connections 17 to the passages 8, the temperature of the clamp members 4, 5 may be maintained substantially the same as that of the casing flanges. If the casing cools rapidly, the flanges thereof will likewise cool at a relatively rapid rate, whereas if the flanges were made heavy enough to produce the same clamping effect as that produced by the use of the improved clamp in addition to the normal clamping studs of the casing, the mass of metal in the flanges would necessarily be much greater and temperature changes of the casing would not be followed by rapid similar changes in the temperature of the flanges. The initial positioning studs 9 have greatest utility in the embodiment disclosed in Fig. 5, although these studs are also of advantage in preliminarily holding the lower clamp members 5 in position in the other embodiments. The upper clamp members 4 in the embodiments illustrated in Figs. 3 and 7, may be hooked over the studs 7, 19 and will not tend to drop off, and the positioning studs for these members may therefore be dispensed with.

From the foregoing description it will be apparent that the invention provides a relatively simple and compact clamp for insuring effective clamping of the adjoining casing sections so as to withstand enormous pressures and with localized masses of metal of minimum size. The clamp members 4, 5 may be formed of stronger material than the casing sections 2, 3, and may be formed in sections of any desired length. It is not essential that the clamps extend along all portions of the casing flanges, and the clamp members may be formed of sections of relatively short length with intervening gaps between the successive clamps.

It should be understood that it is not desired to limit the invention to the exact details of construction herein shown and described, for various modifications within the scope of the claims may occur to persons skilled in the art.

It is claimed and desired to secure by Letters Patent:

1. In combination, a casing for confining a hot working fluid and having coacting flanges, a sectional clamp comprising a pair of contacting clamp members connecting said flanges, said clamp having passages therein, means engaging said members for urging said members against the coacting flanges to clamp the flanges together, and means for conducting fluid from within said casing through said passages.

2. In combination with a pair of coacting flanges of a casing confining a hot working fluid, a sectional clamp comprising a pair of contacting clamp members and having lateral projections cooperating to effect a clamping action upon said flanges, and means for maintaining the temperature of said clamp substantially the same as that of said flanges.

3. In combination with a pair of coacting flanges of a casing confining a hot working fluid, a clamp having lateral projections cooperating to effect a clamping action upon said flanges, and means including a passage in said clamp located in a portion thereof intermediate said projections for circulating a portion of said hot working fluid from within said casing through said clamp.

4. In combination, a casing having a pair of coacting flanges, a clamp comprising similar members engaging said flanges, adjustable means for directly clamping said flanges together through said members, and independently adjustable means engaging said members for indirectly clamping said flanges together.

5. In combination, a casing having a pair of coacting flanges, a pair of clamp members coacting directly with said flanges and with each other, adjustable means for directly clamping said flanges together through a portion of at least one of said clamp members, and other adjustable means coacting with said clamp members for further urging the same against said flanges and against each other.

6. In combination, a casing having a pair of direct coacting flanges, a clamp comprising a pair of members each of which coacts with one of said flanges and which also have mutual direct coacttion with each other, adjustable means for directly clamping said flanges together through a portion of at least one of said members, and independently adjustable means for urging said members toward each other and against said flanges to effect indirect additional clamping of the latter.

7. Apparatus for confining a hot working fluid, comprising cooperating casing sections, a clamping element having a passage therein and disposed to clamp said casing sections together, and means for conveying working fluid into said passage for modifying the temperature of said clamping element to enhance its clamping efficiency.

8. A casing for confining a hot working fluid, comprising casing sections having coacting flanges, a clamping element having a passage therein and disposed to clamp said coacting flanges together, and means for conveying working fluid from within the casing into said passage for modifying the temperature of said clamping element to improve the clamping action thereof.

HANS DAHLSTRAND.